United States Patent [19]

Goedecke et al.

[11] Patent Number: 4,656,881
[45] Date of Patent: Apr. 14, 1987

[54] LINEAR DRIVE

[75] Inventors: Wolf-Dieter Goedecke, Unterkirnach; Reinhard Schwenzer, Düsseldorf; Ralf Huber, Brigachtal, all of Fed. Rep. of Germany

[73] Assignee: GAS Gesellschaft für Antriebs- und Steuerungs-technik mbH & Co. KG, St. Georgen, Fed. Rep. of Germany

[21] Appl. No.: 784,375

[22] Filed: Oct. 4, 1985

[30] Foreign Application Priority Data

Oct. 9, 1984 [DE] Fed. Rep. of Germany ....... 3436977

[51] Int. Cl.⁴ ............................................. F16H 21/44
[52] U.S. Cl. ........................................ 74/110; 92/137; 92/5 R; 384/55
[58] Field of Search ............... 74/110; 308/6 R, 3 A, 308/3 R; 384/53, 55; 92/137, 5 R

[56] References Cited

U.S. PATENT DOCUMENTS

| | | | |
|---|---|---|---|
| 2,356,641 | 8/1944 | Wolfle | 308/3 A |
| 2,385,946 | 10/1945 | Schorer | 74/110 |
| 2,883,736 | 4/1959 | Crane | 308/6 R |
| 3,427,080 | 2/1969 | Folk | 308/6 R |

FOREIGN PATENT DOCUMENTS

| | | |
|---|---|---|
| 556101 | 8/1932 | Fed. Rep. of Germany . |
| 924721 | 3/1955 | Fed. Rep. of Germany . |
| 940798 | 3/1956 | Fed. Rep. of Germany . |
| 2402401 | 7/1974 | Fed. Rep. of Germany . |
| 7508272 | 3/1975 | Fed. Rep. of Germany . |
| 3124915 | 1/1983 | Fed. Rep. of Germany . |
| 3205143 | 9/1983 | Fed. Rep. of Germany . |
| 3403830 | 10/1984 | Fed. Rep. of Germany . |
| 3328786 | 2/1985 | Fed. Rep. of Germany . |

Primary Examiner—Andrew V. Kundrat
Attorney, Agent, or Firm—Poms, Smith, Lande & Rose

[57] ABSTRACT

A linear servo drive comprises substantially a drive section (29) and a carriage (30) running on the latter. The carriage (30) is seated on the drive section (29) via a roller bearing consisting of guide strips (36) extending in the axial direction and coacting with rollers (37, 37a to 37c).

In order to increase the mechanical loading capacity of the drive section and, thus, of the entire drive and to reduce at the same time its weight, the drive section (29) is given a radial cross-section exhibiting flange-like end portions (34) extending in a star-like pattern from a central area (32) and provided with surface portions which extend in an approximately radial direction and which define the plane of the roller bearing.

15 Claims, 4 Drawing Figures

LINEAR DRIVE

The present invention relates to a linear drive, in particular a linear drive comprising a drive section extending along a longitudinal axis, a carriage running on the said section and drive means effecting a relative axial movement between the said drive section and carriage, the carriage being seated on the drive section via roller bearings for linear motion. Linear drives of this kind have been known for example in handling technology. They are used in this field in the form of so-called linear or portal units where each element moves along a straight axis relative to another element under the action of a hydraulic or pneumatic pressure fluid or an electric or magnetic drive. The units may either be so-called basic units with additional linear or even rotary units connected thereto, or may in other embodiments be composed according to a modular system to permit a handling device to perform movements along almost any desired axes. Normally, a gripper arm or tool is mounted on the free end of the arm so composed from several such units, for the purpose of performing a conveying or assembly function along a pre-determined path of movement.

Certain known linear drives of the type described above are designed in such a manner that the cross-sectional shape of the drive section is approximately rectangular in the radial direction and the carriage is provided with a matching passage opening so that the drive section is fully contained therein. The drive section is provided in the area of its longitudinal walls with hardened and ground guide profiles, and rollers are provided on the respective associated points of the carriage so that the relative movement between the drive section and the carriage is facilitated by the resulting linear rolling bearing.

Lately, however, the requirements of the users of such handling devices are getting more and more contradictory. On the one hand, they require that the outer dimensions and weights of the handling devices be kept as low as possible, while on the other hand the loads which are required to be transmitted by the individual elements of the handling device increase constantly.

Now, it is the object of the present invention to improve a linear servo drive of the type described above in such a manner that the loads that can be transmitted are increased while their outer dimensions and their weight are reduced or at least maintained.

This objective is achieved according to the invention by an arrangement in which the radial cross-section of the drive section is designed in such a manner that flange-like end portions project in a star-like pattern from a central area and are provided with surface portions extending in an approximately radial direction and defining the plane of the roller bearing.

The invention solves the underlying problem in an absolutely perfect manner because a drive section exhibiting the before-described cross-sectional shape offers improved mechanical properties, as regards torsional moment, bending moment and shearing force, as compared with the known drive sections with their rectangular cross-section.

In one preferred embodiment of the invention, the drive section exhibits an approximately X-like shape, the individual legs extending preferably at approximately 90° relative to each other.

These embodiments of the invention offer the advantage that the X-shaped section permits the use of four roller bearings arranged symmetrically relative to each other. In addition, it has been found that such a drive section has a torsional moment which is for example by approx. 8 times greater, a bending moment which is 2.2 times greater and a shearing force which is 2.7 times greater than in the case of the conventional drive sections with rectangular cross-section.

In a further embodiment of the invention, the legs are provided with guide strips. In this case, the carriage is provided with rollers which have their axes of rotation extending in parallel to such guide strips.

This arrangement, which is known as such, has proven its value in practical use if the guide strips are ground and hardened; it goes, however, without saying that the guide strips may, by kinematic reversal, be arranged with the same advantage on the carriage and the rollers on the drive section. Further, it is also possible to use sliding bearings.

According to another embodiment of the invention, the carriage is provided in the conventional manner with a passage opening conforming in shape to the radial cross-sectional shape of the drive section.

Still another embodiment of the invention is characterized in that, preferably, a cylindrical tube of stainless steel or a glass-reinforced or carbon-reinforced plastic material or the like is arranged axially in the central area of the drive section.

This embodiment provides the advantage that a piston designed either with or without a piston rod may work in the conventional manner within the said cylindrical tube. The use of a tube of stainless steel or of a plastic material of the described types offers in this case the advantage that the desired dimensional accuracy, in particular of the inner surface of the tubes, can be ensured already by commercially available semiproducts and that this element, for which high accuracy is required, does not require the drive section to be subjected to difficult and, thus, expensive machining operations. It is sufficient in this case to ensure that the tubes are properly positioned and aligned while the accuracy of fit and the running properties of the piston are ensured by the surface quality of the semiproduct as such.

In still another embodiment of the invention, the drive section is provided with axially extending additional bores and/or tubes to serve as passages for electric lines or pressure fluids.

This embodiment of the invention offers the advantage that a double-acting cylinder, i.e. a cylinder which is subjected to the action of pressure fluid on both ends, may be provided in the tube of the drive section while at the same time all electric connections and pressure fluid connections can be arranged on one side of the drive section because the distribution to the other side can be effected through the said additional bores or tubes. In addition, any pressure fluid or electric control signals received on the one side of the drive section can be supplied also to an additional drive or tool mounted on the other side.

This permits the linear drive according to the invention to be rendered still more compact and its dynamic properties to be further improved because the very short lines for the pressure fluid give rise to little dead volumes.

In a further embodiment of the invention, the drive section is provided with a jacket of a glass-reinforced or carbon-reinforced plastic material whose inner space, which is not occupied by any built-in items, is filled with plastic foam and/or provided with radial cross-members.

This embodiment of the invention leads to a still further considerable reduction in weight because all those parts which do not perform a mechanical guiding function are made of a very light-weight plastic material. Due to the selected radial cross-sectional shape, the drive section of this embodiment of the invention still has a high mechanical load-bearing capacity which is sufficient for any mounting and assembly work that may be required. The drastic reduction in weight achieved by this embodiment of the invention permits in particular very high travelling speeds of the linear drive and, thus, of the whole handling device so that very favorable effects are achieved for all tasks where high speeds are demanded in the first place.

In still another embodiment of the invention, the drive section is provided with a lateral recess accommodating one element of a linear measuring device which coacts with another element arranged at the carriage. In particular, the recess may for example accommodate a linear glass scale while the element arranged on the side may consist of an optical measuring unit embracing the said scale practically in the manner of a fork. Alternatively, a potentiometer or an inductive displacement pick-up may also be used.

It results that the linear measuring device is fully integrated in this embodiment of the invention and does not project laterally so that it cannot be damaged unwantedly. In addition, it is protected effectively from environmental influences, for example fouling. And it is a further advantage of the recessed arrangement of the measuring device that this arrangement provides optimum operating conditions for an optical measuring device because there is no risk of interference by stray light or the like.

In one embodiment of the invention, the recess is covered up by a shutter-like cover which extends on both sides of the carriage and is entrained by the latter.

This measure provides the advantage that the recess containing the linear measuring device is sealed off hermetically.

Still another embodiment of the invention is characterized by the fact that one surface of the drive section coacts with the brake of the carriage. The said surface may in particular be of level shape and may interconnect two end portions peripherally.

It is one of the advantages of this embodiment of the invention that the greatest part of the linear movement can be passed at high speed because a brake becomes active at the end of the movement to stop the relative movement at a pre-determined position. In this manner, higher travelling speeds can be achieved than in the case of a drive without such brake where the selected speed must not be excessively high if the carriage is to be prevented from overriding the desired position or oscillating about the latter. In addition, braking is possible in emergency situations, and a safe holding function can be realized by the brake.

Other advantages of the invention will become apparent from the following specification and the attached drawing.

Certain embodiments of the invention will be described hereafter with reference to the drawing in which.

Figure 1:
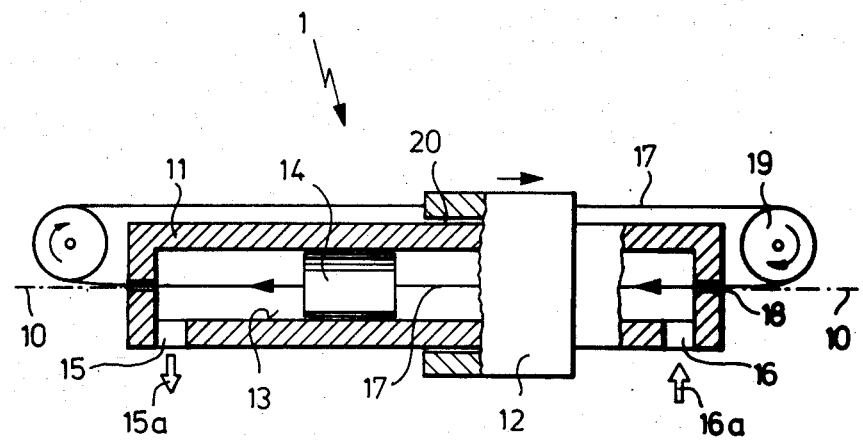
FIG. 1 shows a diagrammatic representation of one embodiment of a linear servo-drive according to the invention, without a piston rod.

Referring now to FIG. 1, a pneumatic linear drive for a movement along a longitudinal axis 10 is designated generally by reference numeral 1. The linear movement is rendered possible by the drive section 11 on which a carriage 12 is seated for displacement thereon. The drive section 11 comprises an axial cylindrical bore 13 accommodating a piston 14. Openings 15, 16 provided on both longitudinal ends of the cylindrical bore 13 and, thus, on both sides of the piston 14 serve to admit a pressure medium, usually compressed-air or a hydraulic liquid, for example in the directions 15a and 16a indicated in the drawing. The piston 14 operates without a piston rod. It is held by its two ends between a cable 17 or a tape which passes through pressuretight passage openings 18 in the end faces of the drive section 11 where it is returned via a deflection pulley 19 and finally connected with the carriage 12.

When the pressure fluid enters the cylindrical bore 13 in the direction of arrows 15a and 16a, the piston is urged towards the left, the right deflection pulley 19 turns in clockwise direction and the carriage 12 moves to the right. This oppositely directed movement of piston 14 and carriage 12 permits the carriage to travel through the whole travelling path of the linear drive 1 as defined by the length of the cylindrical bore 13.

Figure 2:
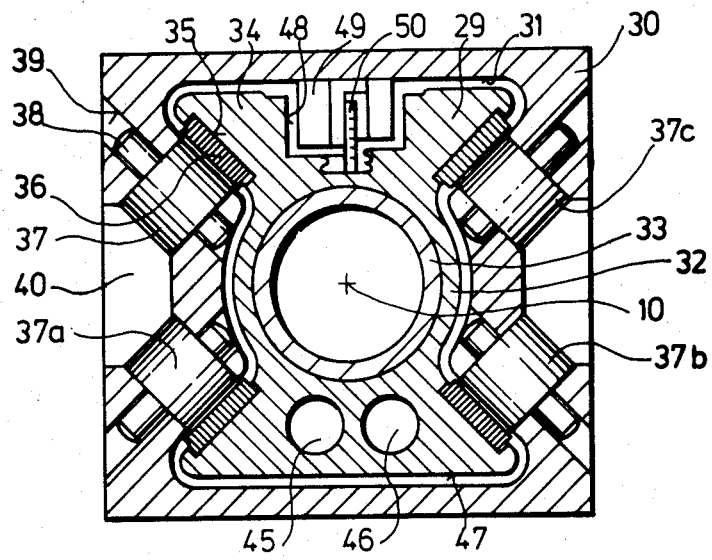
FIG. 2 shows a radial cross-section through a linear drive according to the invention with numerous details.

Now, certain details of the radial shapes of the drive section 11 and the carriage 12 and the guide 20 effected between these two elements will be described with reference to the radial cross-section shown in FIG. 2 and the top view shown in FIG. 3;

In FIG. 2, a carriage 30 can be seen to run on a drive section 29. The carriage is provided for this purpose with a passage opening 31 whose radial cross-sectional shape matches that of the drive section 29.

The drive section 29 comprises a central area 32 which in the embodiment shown is of cylindrical shape and in which a cylindrical tube 33 extends coaxially with the longitudinal axis 10. The central area 32 is followed by four flange-like end portions 34 projecting therefrom in star-like pattern so that the whole radial cross-section of the drive section 29 and, thus, of the passage opening 31 resembles in shape approximately an X.

The flange-like end portions 34 comprise inwardly inclined portions 35 carrying axially extending guide strips 36. The latter are offset relative to each other by, for example, approximately 90° and extend in an approximately radial direction relative to the longitudinal axis 10.

Facing the guide strips 36, there are provided rollers 37 in the carriage 30 whose axes of rotation 38 extend in parallel to the guide strips 36, i.e. parallel to a radial direction relative to the longitudinal axis 10. In the practical example shown, the axes of rotation 38 take the form of pins running in bores 39. The carriage 30 whose radial cross-section exhibits a substantially square outer shape is provided on opposite side faces with trapezoidal recesses 40 the inclined lateral faces of which end in cavities in the form of pockets. These cavities permit rollers 37, 37a, 37b, 37c to be introduced laterally and then be fixed in position by inserting the pins through the bores 39.

It is of course also possible to provide the elements 36, 37 and 38, which form the longitudinal roller bearing between the drive section 29 and the carriage 30, with adjusting means to permit possible assembly errors to be compensated subsequently.

As can be further seen in FIG. 2, there are two further bores 45, 46 provided in addition to the central cylindrical tube 33 which may for example accommodate a piston 14, as shown in FIG. 1. One of the said bores may also take the form of a longitudinal slot and may, for example, accommodate electric cables while the other bore serves as pressure fluid line. The two longitudinal bores 45, 46 therefore act to interconnect the two end faces of the drive section 29 so that any control or connection elements need to be arranged only on one end face of the drive section 29.

The underside of the drive section 29 takes the form of a plane face 47 forming a peripheral connection between two end portions 34. The face 47 may serve as a braking surface for a brake not shown in the drawing which acts between the carriage 30 and the drive section 29.

Figure 3:
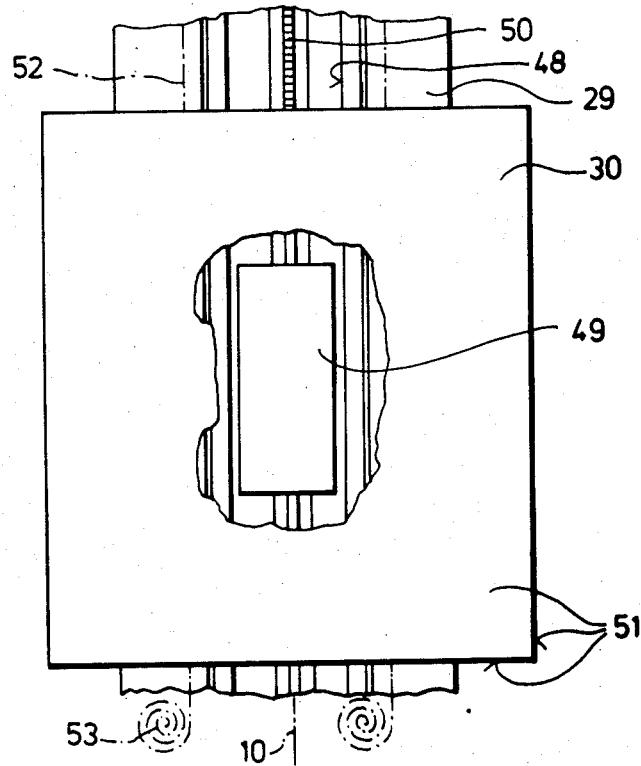
FIG. 3 shows a top view of the arrangement shown in FIG. 2.

As is further apparent from FIGS. 2 and 3, the drive section 29 is provided on its top face with a recess 48 for receiving a measuring unit 49 arranged on the carriage 30. The measuring unit 29 consists for example of a fork-shaped light barrier, the central space of the fork being passed by a scale 50, in particular a glass scale. As the scale moves through the fork, line markings arranged on the scale 50 move past the light barrier and generate pulses in the measuring unit 49. This permits precise recognition of the distance passed and, thus, a predetermined path length to be exactly observed.

Above the recess 48, a shutter-like cover 52 can be seen which can be rolled up for example by its longitudinal ends 53. The cover 52 is fastened on both sides of the carriage 30 which thus forms a window in the cover 52 through which the measuring unit 49 extends into the recess 48. The recess 48 is, therefore, sealed off hermetically since the cover 52 is entrained by the carriage 30 during the latter's movement and rolled up or unwound as required at the ends 53.

Finally, lateral faces 51 of the carriage 30 may be provided in the known manner with threads, threaded bores, flanges or the like for mounting additional, linear or rotary, servo-drives.

Figure 4:
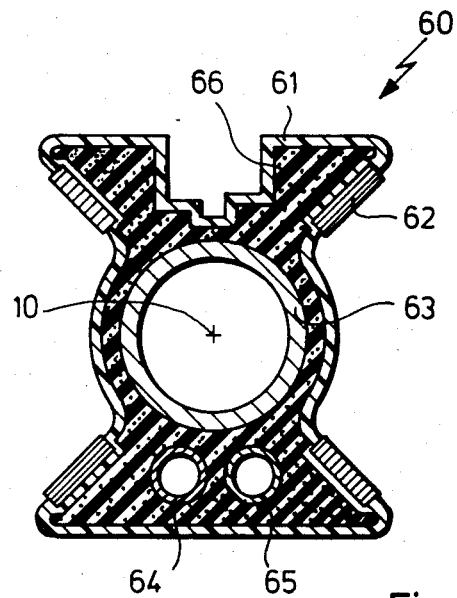
FIG. 4 shows a radial cross-section through another embodiment of a drive section according to the invention.

In the embodiments shown in FIG. 4, the drive section 60 has the same radial cross-sectional shape as the drive section 29 in FIG. 2, except that the mechanical structure of the drive section 60 differs from that of FIG. 2 insofar as now a jacket 61 of a plastic material, in particular a carbon-reinforced or a glass-reinforced plastic material, is provided. Guide strips 62 arranged in the manner shown already in FIG. 2 are formed integrally with the jacket 61 for coacting with the carriage of the type which has likewise been shown in detail in FIG. 2.

The cavity enclosed by the jacket 61 is filled with plastic foam 66, for example a foamed polyurethane to the extent it is not occupied by a central tube 63 or additional tubes 64, 65. The cavity may also contain cross-members, either as an alternative or additionally.

The tubes 63 to 65 may in the embodiment of FIG. 4 also consist of a carbon-reinforced or glass-reinforced plastic material in order to reduce the weight of the drive section 60 still further.

We claim:

1. A linear drive module for industrial handling devices comprising
    a profiled elongated member extending along a longitudinal axis, said member being provided with an axial bore having a piston longitudinally reciprocal therein;
    terminals associated with said bore for feeding fluid to said bore on at least one side of said piston;
    a carriage slidably arranged on said elongated member for displacement in said longitudinal axis;
    linking means associated with said carriage and said piston for linking said carriage to said piston to allow relative displacement between said carriage and said elongated member in response to said fluid being fed to said terminals; and
    roller bearing means arranged between said elongated member and said carriage, said roller bearing means including rollers mounted on said carriage running on surface portions of flange-like end portions of said elongated member, said end portions projecting radially in a star-like pattern from a central area of said elongated member.

2. Drive according to claim 1, characterized in that the elongated member has approximately the shape of an X.

3. Drive according to claim 2, characterized in that the end portions are offset relative to each other by approximately 90°.

4. Drive according to claims 1, characterized in that the end portions are provided with guide strips (36; 62) thereon engaged by said rollers.

5. Drive according to claim 4, wherein the axes of rotation (38) of said rollers extend parallel to the longitudinal axes of said guide strips (36; 62).

6. Drive according to claim 1 characterized in that the carriage (30) is provided with a passage opening (31) conforming in shape to the radial cross-sectional shape of the elongated member (29; 60).

7. Drive according to claim 1 characterized in that a cylindrical tube (33; 63) is arranged axially in the central area (32) of the elongated member (29; 60).

8. Drive according to claim 1 characterized in that the elongated member (29; 60) is provided with axially extending additional passageways to serve as passages for electric lines or pressure fluids.

9. Drive according to claim 1 characterized in that the elongated member is provided with a jacket (61) whose inner space, which is not occupied by any built-in items, is filled with plastic foam (66).

10. Drive according to claim 1 characterized in that the elongated member (29; 60) is provided with a lateral recess (48) accommodating one element of a linear measuring device which coacts with another element arranged on the carriage (30).

11. Drive according to claim 10, characterized in that the recess (48) accommodates a linear glass scale (50) and that an optical measuring instrument unit (49) having the configuration of a fork is arranged on the carriage (30), said scale being disposed between the spaced sections of said unit (49).

12. Drive according to claim 10, characterized in that the recess (48) is covered up by a shutter-like cover (52) which extends on both sides of the carriage (30) and is entrained by the latter.

13. Linear drive comprising a profiled drive section (11; 29; 60) extending along a longitudinal axis (10), a carriage (12; 30) running on the said section and drive means (14, 17, 19) effecting a relative axial movement between the said drive section (11; 29; 60) and carriage (12; 30), the carriage (12; 30) being seated on the drive section (11; 29; 60) via a plurality of roller bearings for linear motion, thereon, the radial cross-section of the drive section (29; 60) having flange-like end portions (34) projecting in a star-like pattern from a central area (32) and being provided with surface portions (35) extending in radial direction and defining the plane of the roller bearings, said surface portions (35) having guide strips (36; 62) thereon engaged by said roller bearings.

14. Drive according to claim 13, characterized in that one surface (47) of the drive section (29; 60) coacts with a brake on the carriage (30).

15. Drive according to claim 14, characterized in that the surface (47) is of level shape and interconnects two end portions (34) peripherally.

* * * * *